(12) United States Patent
Bennett

(10) Patent No.: US 9,336,190 B2
(45) Date of Patent: May 10, 2016

(54) WRITING PAD WITH SYNCHRONIZED BACKGROUND AUDIO AND VIDEO AND HANDWRITING RECOGNITION

(71) Applicant: ENPULZ, L.L.C., Chicago, IL (US)

(72) Inventor: James D. Bennett, Hroznetin (CZ)

(73) Assignee: ENPULZ, LLC, Austin, TX (US)

( * ) Notice: Subject to any disclaimer, the term of this patent is extended or adjusted under 35 U.S.C. 154(b) by 0 days.

(21) Appl. No.: 14/257,132

(22) Filed: Apr. 21, 2014

(65) Prior Publication Data

US 2014/0225834 A1    Aug. 14, 2014

Related U.S. Application Data

(63) Continuation of application No. 12/503,350, filed on Jul. 15, 2009, now Pat. No. 8,704,772.

(60) Provisional application No. 61/081,384, filed on Jul. 16, 2008.

(51) Int. Cl.
*G09G 5/00* (2006.01)
*G06F 17/24* (2006.01)
*G06F 3/038* (2013.01)
*G06F 3/041* (2006.01)
*G06F 3/048* (2013.01)

(52) U.S. Cl.
CPC .............. *G06F 17/242* (2013.01); *G06F 3/038* (2013.01); *G06F 3/041* (2013.01); *G06F 3/048* (2013.01); *G06F 2203/0381* (2013.01)

(58) Field of Classification Search
CPC ... G06F 1/3203; G06F 1/3262; G06F 1/3287; G06F 3/041; G06F 3/0416; G09G 2300/023; G09G 2330/021
USPC .................................. 345/156, 169, 173–184
See application file for complete search history.

(56) References Cited

U.S. PATENT DOCUMENTS 6,523,079 B2 * 2/2003 Kikinis et al. ................ 710/303
2008/0192013 A1 * 8/2008 Barrus et al. .................. 345/173

* cited by examiner

*Primary Examiner* — Duc Dinh
(74) *Attorney, Agent, or Firm* — Garlick & Markison; Bruce E. Garlick

(57) ABSTRACT

A stand alone low cost writing pad includes a rechargeable battery, a low capacity memory, a low power processor, a first pair of connectors and supports audio, video and digital ink capturing functionalities. The writing pad may be detached from and re-attached to a stand alone base unit using the first pair of connectors. The base unit includes another rechargeable battery, high capacity memory, high power processor, and a second pair of connectors. The base unit receives captured audio and digital ink from the writing pad via the communication pathway and the high power processor runs voice recognition and optical character recognition software on received data to generate second data. The second data is displayed on the writing pad and/or stored in the high capacity memory for future use.

21 Claims, 7 Drawing Sheets

WRITING PAD WITH SYNCHRONIZED BACKGROUND AUDIO AND VIDEO AND HANDWRITING RECOGNITION

CROSS-REFERENCE TO RELATED APPLICATIONS/INCORPORATION BY REFERENCE

The present U.S. Utility patent application claims priority pursuant to 35 U.S.C. §120 as a continuation of U.S. Utility application Ser. No. 12/503,350, entitled "Writing Pad with Synchronized Background Audio and Video and Handwriting Recognition," filed Jul. 15, 2009, issuing as U.S. Pat. No. 8,704,772 on Apr. 22, 2014, which claims priority pursuant to 35 U.S.C. §119(e) to U.S. Provisional Application No. 61/081,384, entitled "Stand Alone Writing Pad That Functions Differently When Docked Into a Computer," filed Jul. 16, 2008, both of which are hereby incorporated herein by reference in their entirety and made part of the present U.S. Utility Patent Application for all purposes.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

1. Field of the Invention

The present invention relates generally to computing systems and more particularly to dock able computing systems.

2. Description of the Related Art

The traditional way of taking down notes on a paper has a disadvantage that all information is lost if the paper gets misplaced. Another disadvantage is that archiving notes needs huge storage space. An alternative is to record a speech or a presentation or a conversation between two people. A person may be interested in taking down notes and recording the speech or the conversation simultaneously. Using digital ink and a multimedia recorder is thus an option that needs less storage space than paper based notes and gives full flexibility to the person in terms of ways in which the person can store the speech or the conversation. A notepad that supports digital ink and multimedia recording may be used for writing and recording notes. The above notepad must also comprise voice recognition functionality and optical character recognition functionality thus necessitating high memory and high processing power in the notepad. Presence of high memory and high processing power lead to increase in cost of a notepad and high cost of a notepad prohibits a person from using the notepad for recording notes.

Further limitations and disadvantages of conventional and traditional approaches will become apparent to one of ordinary skill in the art through comparison of such systems with various aspects of the present invention.

BRIEF SUMMARY OF THE INVENTION

A device that supports digital ink capturing and multimedia capturing functionalities when operating in stand alone mode and functions as a display of a computer when docked into the computer, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

DETAILED DESCRIPTION

Figure 1:
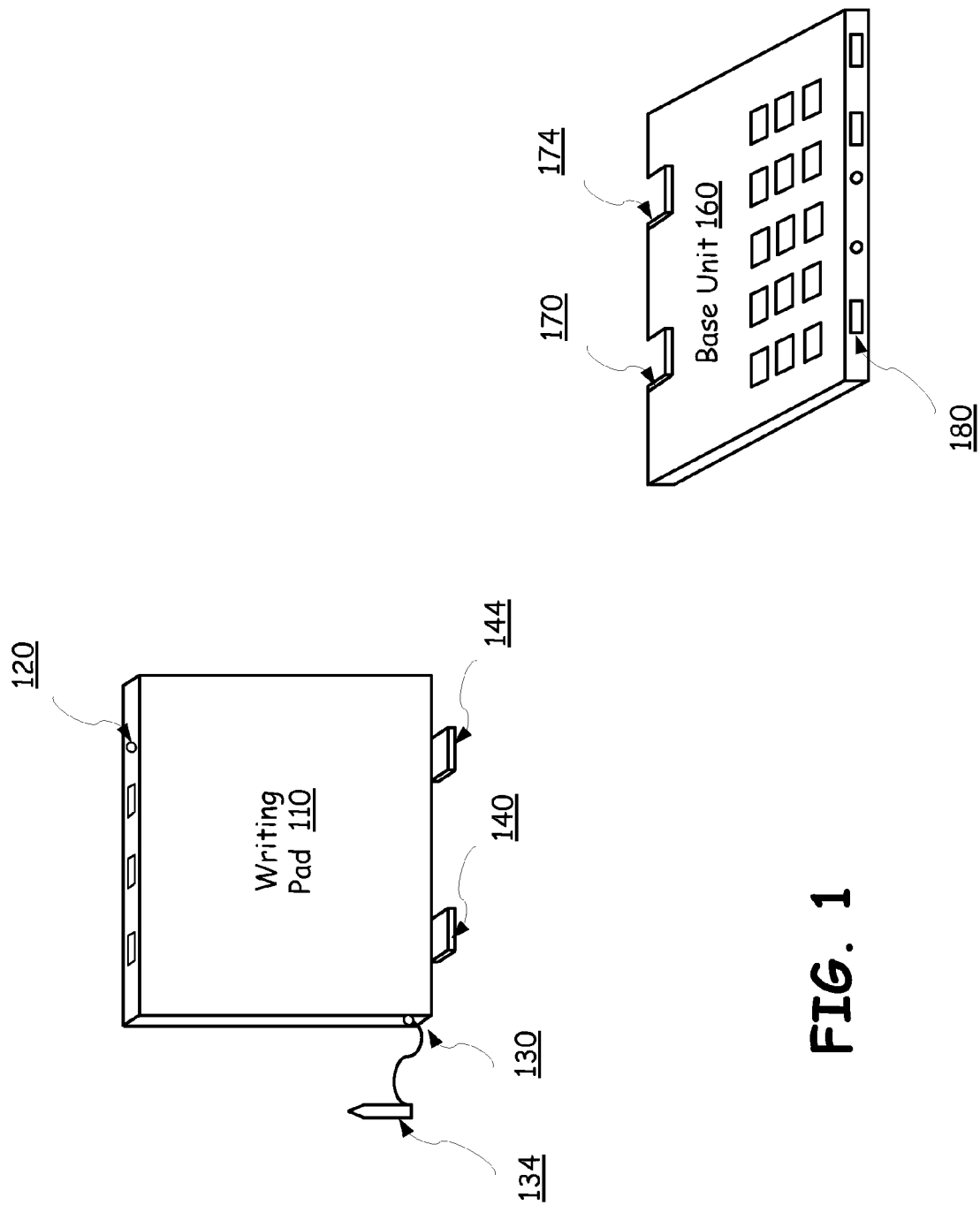
FIG. 1 is a schematic diagram of a writing pad and a base unit where the writing pad functions differently when docked into the base unit in accordance with various aspects of the present invention.

FIG. 1 is a schematic diagram of a writing pad 110 and a base unit 160 where the writing pad 110 functions differently when docked into the base unit 160. The writing pad 110 includes a first pair of connectors 140 and 144, a port 130 for plugging a digital pen 134 into and a plurality of serial and/or parallel ports for connecting one or more peripheral devices with the writing pad 110. Typical examples of the peripheral devices are, for example and without limitation, mouse, USB memory stick, microphone, modem, voice recording device and camera. The writing pad 110 includes a power socket 120 to connect to external dc power supply or external ac power supply via an ac power adapter. The writing pad 110 includes at least one camera, a microphone, a low capacity memory and a processor with low processing power (not shown in FIG. 1). The base unit 160 includes a second pair of connectors 170 and 174, a plurality of keys and a plurality of serial and/or parallel ports for connecting one or more peripheral devices with the base unit 160. The base unit 160 includes a high capacity memory and a processor with high processing power (not shown in FIG. 1). A serial port 180 of the base unit 160 may typically be used to connect any one of a modem, mouse, printer, USB memory stick etc. to the base unit 160. The base unit 160 is adapted to be connected to external dc power supply or eternal ac power supply via an ac power adapter. Each of the writing pad 110 and the base unit 160 includes rechargeable battery.

The writing pad 110 supports digital ink and multimedia recording functionality. Anything written on top surface of the writing pad 110 using the digital pen 134 gets recorded and stored in the low capacity memory of the writing pad 110. The at least one camera and the microphone of the writing pad 110 capture video and audio respectively. The writing pad 110 stores recorded video recorded audio in the low capacity memory. The writing pad 110 functions as a note capturing unit.

The base unit 160 supports voice recognition functionality and optical character recognition (OCR) functionality in addition to supporting standard functionalities that are supported by a computer. The plurality of keys in the base unit 160 serve as an input interface of the base unit 160. The writing pad 110 is docked into the base unit 160 by connecting the first pair of connectors 140 and 144 to the second pair of connectors 170 and 174 such that connector 140 connects to connector 170 and connector 144 connects to connector 174, or vice versa. The writing pad 110 performs as per instructions from the high power processor of the base unit 160 when the writing pad 110 is docked into the base unit 160. In docked mode, the high power processor of the base unit 160 retrieves recorded freehand notes, recorded audio and/or video from the low capacity memory of the writing pad 110 and runs the voice recognition application on the retrieved audio and the OCR application on the retrieved freehand notes. The high power processor of the base unit 160 in addition directs the writing pad 110 to work either in stand alone mode or work as a display for the base unit 160. The writing pad 110 captures freehand notes, audio and/or video if the writing pad 110 is asked to work in stand alone mode. The writing pad 110 receives input data from the base unit 160 and displays the received data on the top surface of the writing pad 110 if the writing pad 110 is instructed to work as a display for the base unit 160. The top surface of the writing pad 110 functions as a video display for the base unit 160.

Flow of data and control information between the writing pad 110 and base unit 160 in when the writing pad 110 is docked into the base unit 160 occurs via data bus and control bus wherein the data bus and the control bus run through the first pair of connectors 140 and 144 and the second pair of connectors 170 and 174. In addition to the data bus and the control bus, power bus runs through the first pair and the second pair of connectors so that in docked mode the writing pad 110 may draw power from the base unit's battery (not shown here) when the writing pad's battery (not shown here) gets fully discharged or during charging.

Figure 2:
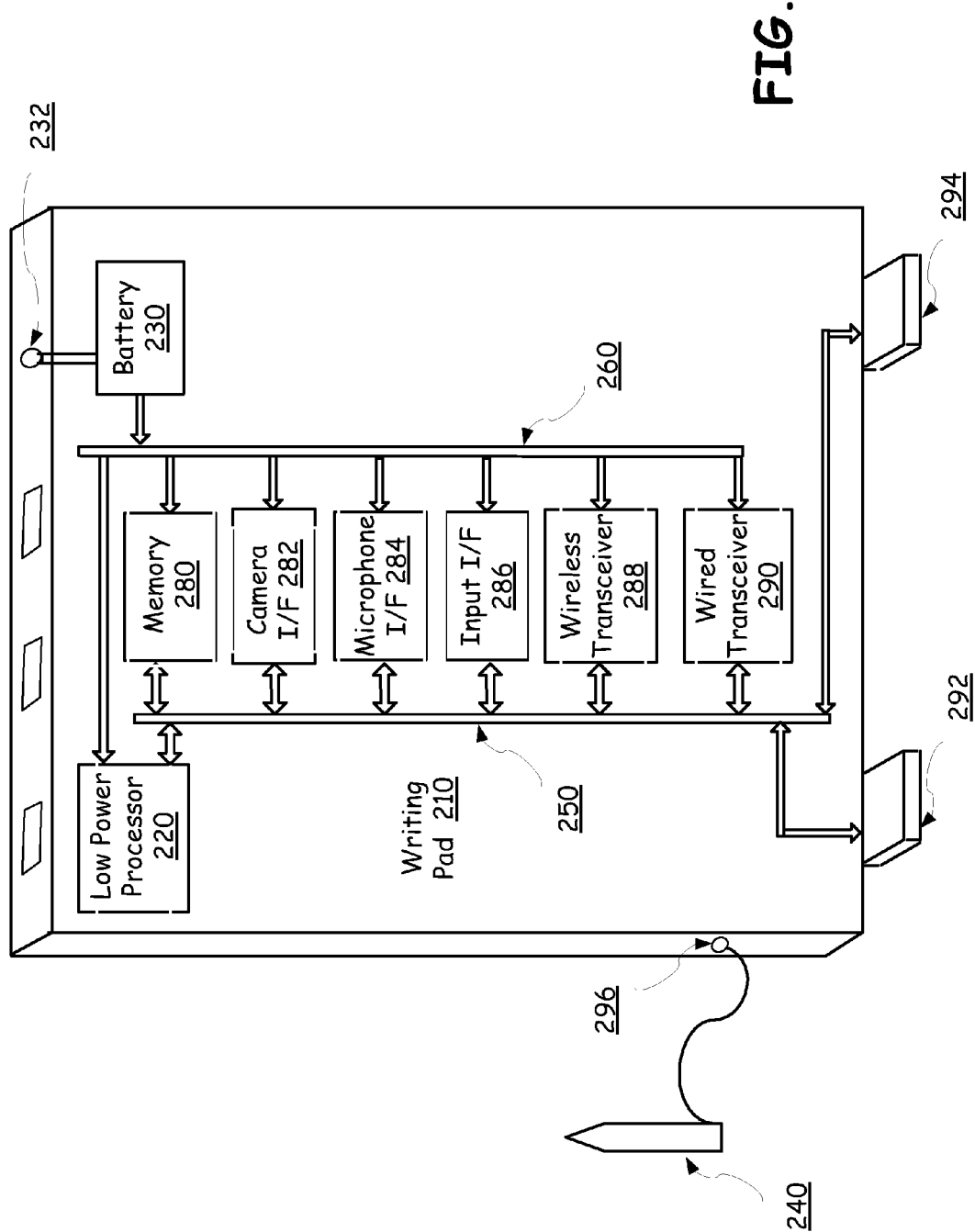
FIG. 2 is a schematic block diagram illustrating interaction between a plurality of functional units of the writing pad of FIG. 1.

FIG. 2 is a schematic block diagram illustrating interaction between a plurality of functional units of the writing pad 110 of FIG. 1. The writing pad 210 includes a processor 220 with relatively low power draw/functionality, a rechargeable battery 230, a data bus 250, a power bus 260, a relatively low capacity memory 280, a wireless transceiver 288, a wired transceiver 290, a first pair of connectors 292 and 294 and a port 296. The port 296 is used to plug a digital pen 240 into the port 296. The writing pad 210 further includes at least one camera and at least one microphone (not shown here). The at least one camera and the at least one microphone are communicatively coupled to the data bus 250 and the power bus 260 via a camera I/F 282 and a microphone I/F 284 respectively. The digital pen 240 gets communicatively coupled to the data bus 250 and the power bus 260 of the writing pad 210 via an input I/F 286. The input I/F 286 may work in conjunction with a display of the writing pad 210. While the display of the writing pad 110 is not separately displayed in FIG. 2, it is a display/input device that works in conjunction with the digital pen 240 to receive input from a user. Further, when the writing pad 110 is docked, the display/input device serves as a display for the base unit.

The low power processor 220, the low capacity memory 280, the camera I/F 282, the microphone I/F 284, the input I/F 286, the wireless transceiver 288 and the wired transceiver 290 get power from the rechargeable battery 230 via the power bus 260. The rechargeable battery 230 is connected to an external dc or ac power source via a power port 232 and can also be recharged via power bus 260. Information flows between the plurality of functional units (280, 282, 284, 286, 288, 290) of the writing pad 210 and the low power processor 220 through the data bus 250. The information includes of one or more of control information and data. The data bus 250, in addition, runs through the first pair of connectors 292 and 294 of the writing pad 210 so that the writing pad 210 exchanges data and/or control information with the base unit 160 of FIG. 1 via the first pair of connectors 292 and 294 when the writing pad 210 is docked into the base unit 160. The writing pad 210 further includes of a plurality of serial and parallel ports that are used to connect a plurality of peripheral devices to the writing pad 210. Examples of the plurality of peripheral devices are modem, mouse, USB memory stick, microphone, camera etc.

The writing pad 210 supports digital ink and audio and video capturing functionality. Anything written on top surface (see writing pad display 410 of FIG. 4) of the writing pad 210 using the digital pen 240 gets stored in the low capacity memory 280 of the writing pad 210. The at least one camera and the at least one microphone of the writing pad 210 respectively capture video and audio from the surroundings. The writing pad 210 stores the captured audio and video in the low capacity memory 280. The at least one microphone may be a microphone with directional audio pickup capability. Video capturing by the at least one camera may be guided by the microphone with directional audio pickup capability. The wireless transceiver 288 exchanges data with a wireless data network via a wireless I/F (not shown here). The wireless data network may be one of a, for example and without limitation, GPRS network, cdma-2000 network, WLAN network, WiMAX network, Bluetooth network, satellite network etc. The wired transceiver 290 exchanges data with a wired data network via one of the plurality of parallel and serial ports of the writing pad 210. Typical examples of the wired data network are cable network, fiber optic network etc. The writing pad 210 is capable of capturing and storing free hand notes, capturing and storing audio and video and connecting to external wired and wireless data networks. The memory 280 and the processor 220 of the writing pad 210 can respectively have low capacity and of low processing power to run limited functionalities supported by the writing pad 210. Cost, weight and size of the writing pad 210 is eventually low because of use of the low capacity memory 280 and the low power processor 220. Of course, the location of the various components of the writing pad 210 could be configured differently in different embodiments.

Figure 3:
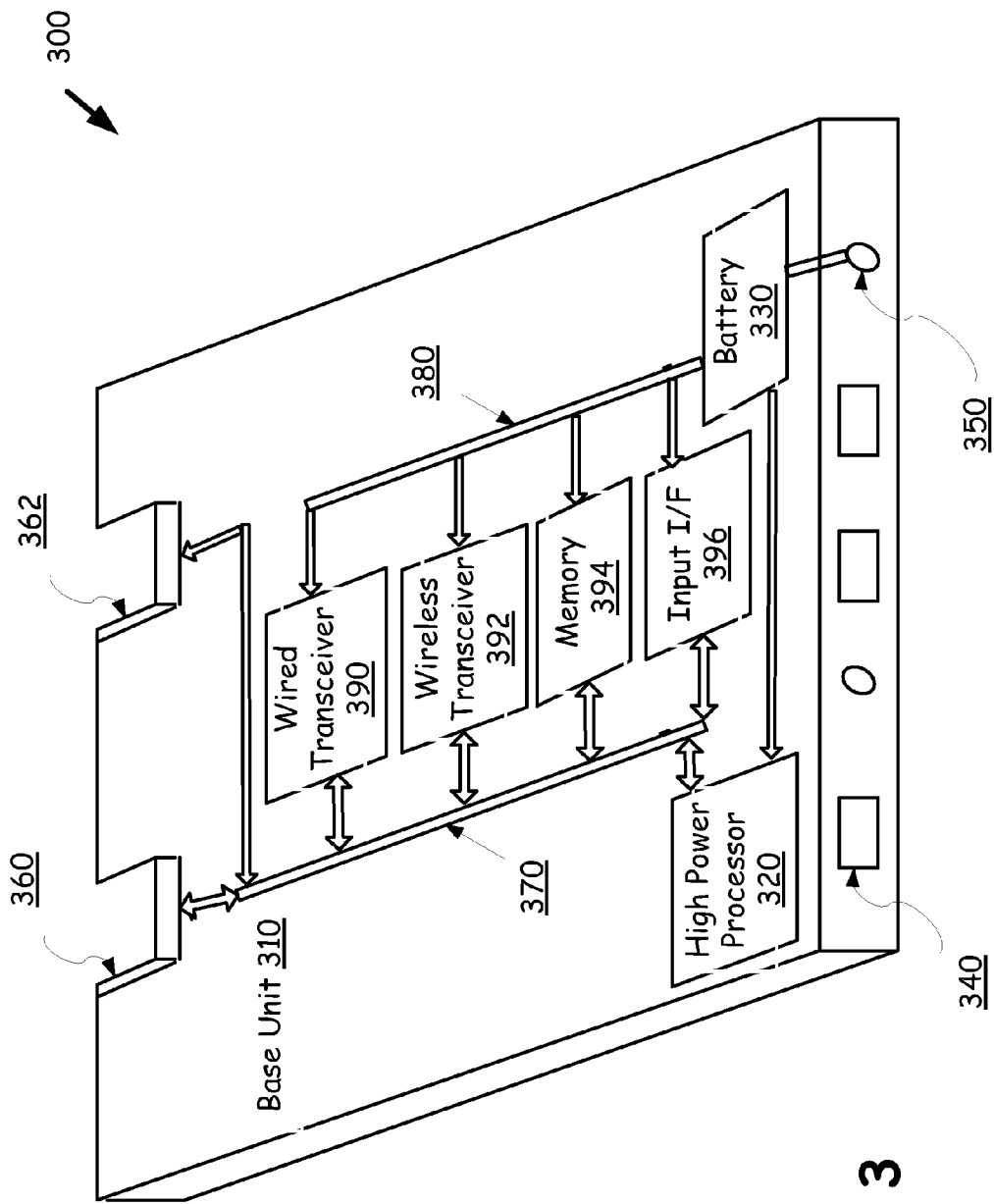
FIG. 3 is a schematic block diagram illustrating interaction between a plurality of functional units of the base unit of FIG. 1.

FIG. 3 is a schematic block diagram illustrating interaction between a plurality of functional units of the base unit of FIG. 1. The base unit 310 includes a processor 320 with high processing power, a second pair of connectors 360 and 362, a data bus 370, a power bus 380, a wired transceiver 390, a wireless transceiver 392, a memory 394 having high capacity, an input OF 396 and a rechargeable battery 330. The rechargeable battery 330 connects to an external dc power source or an ac power source via a power socket 350. An input device for the base unit 310 is one or more of a, for example and without limitation, keypad, touch screen, pen and touchpad, mouse etc. The base unit 310, in addition, includes of a plurality of ports to communicatively connect peripheral devices with the base unit 310. Port 340 is one of the plurality of ports of the base unit 310. The plurality of functional units 320, 390, 392, 394 and 396 run on power received from the battery 330 via the power bus 380. The plurality of functional units 320, 390, 392, 394 and 396 are communicatively connected to the data bus 370. The wired transceiver 390, the wireless transceiver 392, the high capacity memory 394 and the input I/F 396 exchange information with the high power processor 320 via the data bus 370. The information is one or more of a control information and data. The data bus 370 runs through the second pair of connectors 360 and 362 so that the base unit 310 exchanges data with the writing pad 110 of FIG. 1 via the second pair of connectors 360 and 362 when the writing pad 110 is docked into the base unit 310. The base unit 310 does not include a screen.

The base unit 310 supports OCR functionality and voice recognition functionality. The high power processor 320 of the base unit 310 overrides the low power processor 220 of the writing pad 210 of FIG. 2 when the writing pad 210 is docked into the base unit 310. In docked mode, the plurality of functional units of the writing pad 210 receive instructions from the high power processor 320 of the base unit 310 and execute the received instructions. The base unit 310 retrieves data from the low capacity memory 280 of the writing pad 210 via the data bus 250 and the data bus 370 when the writing pad 210 is docked into the base unit 310. The base unit 310 runs an OCR application and a voice recognition application on the retrieved data. The base unit 310 uses a processor with high processing power and a memory with high capacity to run the OCR application and voice recognition application. In docked mode the base unit 310 further uses the writing pad 210 as a screen. The base unit 310 sends data to be displayed to the writing pad via the data bus 370 and the data bus 250 of the writing pad 210. The base unit 310 directs the input I/F 286 of the writing pad 210 to receive the data to be displayed from the data bus 250 and display the received data on top surface of the writing pad 210.

Figure 4:
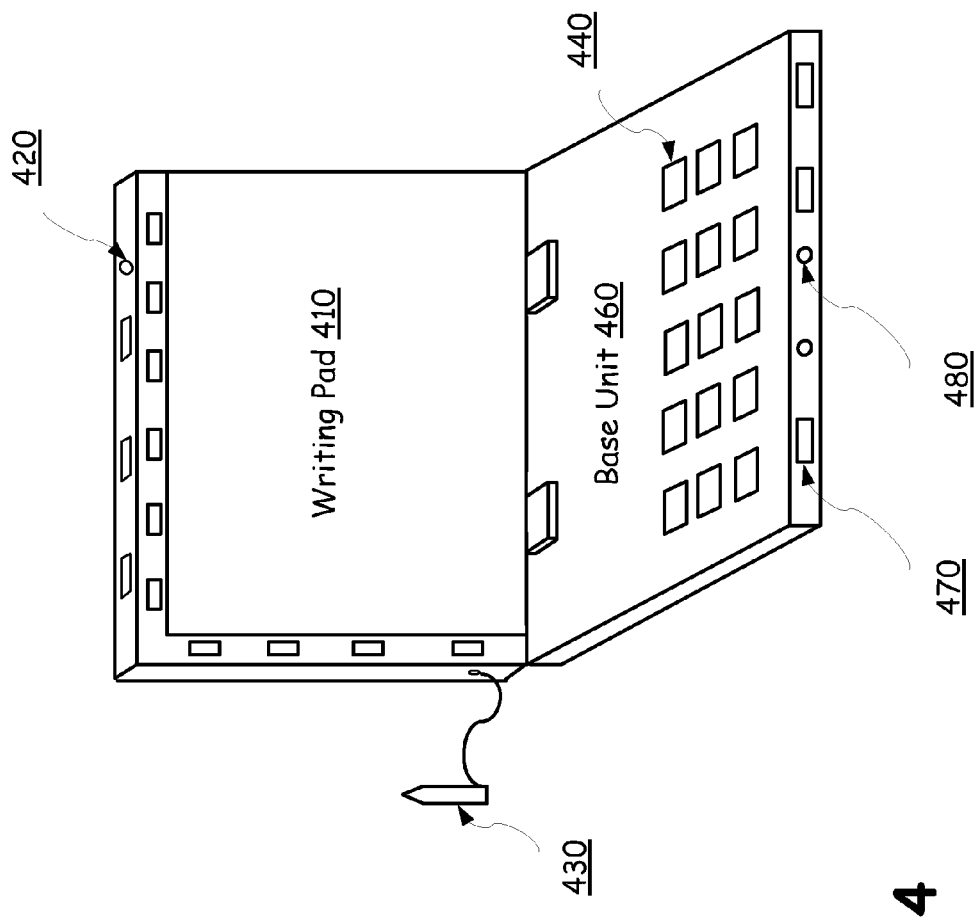
FIG. 4 is a schematic diagram of the writing pad of FIG. 1, the writing pad is docked into the base unit of FIG. 1.

FIG. 4 is a schematic diagram of the writing pad of FIG. 1, the writing pad is docked into the base unit 160 of FIG. 1. The writing pad 410 is docked into the base unit 460 using the first pair of connectors 140 and 144 and the second pair of connectors 170 and 174 of FIG. 1. In the docked mode, i.e., when the writing pad 410 is docked into the base unit 460, connector 140 is communicatively connected to connector 170 and connector 144 is communicatively connected to connector 174. In stand alone mode, i.e., when the writing pad 410 is not docked into the base unit 460, the writing pad 410 performs freehand notes capturing and storing functionality, audio and video capturing and storing functionality. A digital pen 430 communicatively connected to the writing pad 410 is used to write notes on top surface of the writing pad 410. The writing pad 410 has a low power processor, a rechargeable battery and a low capacity memory to support stand alone mode functionalities. A power socket 420 is used to connect the writing pad 410 to an external dc or ac power supply if the rechargeable battery of the writing pad 410 needs charging. The base unit 460 has a high power processor, a rechargeable battery, a keypad 440 and a high capacity memory. The base unit 460 supports standard functionalities supported by a computer. The keypad 440 serves as an input device to the base unit 460. The base unit 460 includes a plurality of ports via which the base unit 460 communicates with one or more devices. Port 470 is one of the plurality of ports of the base unit 460. The plurality of ports are one or combination of serial port and parallel port. The rechargeable battery of the base unit 460 is connected to an external dc or ac power supply through power socket 480 of the base unit 460.

In docked mode, the high power processor of the base unit 460 overrides and/or augments the low power processor of the writing pad 410. The writing pad 410 and the base unit 460 exchange information via data buses that run through the first pair of connectors 140 and 144 and the second pair of connectors 170 and 174. The information includes data and/or control information. The base unit 460 uses the writing pad 410 as a display in docked mode. The base unit 460 sends data to be displayed on the writing pad 410 to the data buses. The high power processor of the base unit 460 instructs the low power processor of the writing pad 410 to receive the data from the data buses and subsequently display the received data on top surface of the writing pad 410. A display is laid on the top surface of the writing pad 410 so that the data sent by the base unit 460 is visible on the writing pad 410. In docked mode, the base unit 460 retrieves freehand notes, audio and video stored in the low capacity memory of the writing pad 410. The base unit runs OCR application and voice recognition application on the retrieved freehand notes and the retrieved audio respectively.

In another embodiment the base unit 460 directs the writing pad 410 to function in stand alone mode even when the writing pad 410 is docked into the base unit 460. In the another embodiment the writing pad 410 captures one or combination of freehand notes, audio and video and sends captured data to the base unit 460 via the data buses. The base unit 460 runs the OCR application and voice recognition application on the captured data.

Figure 5:
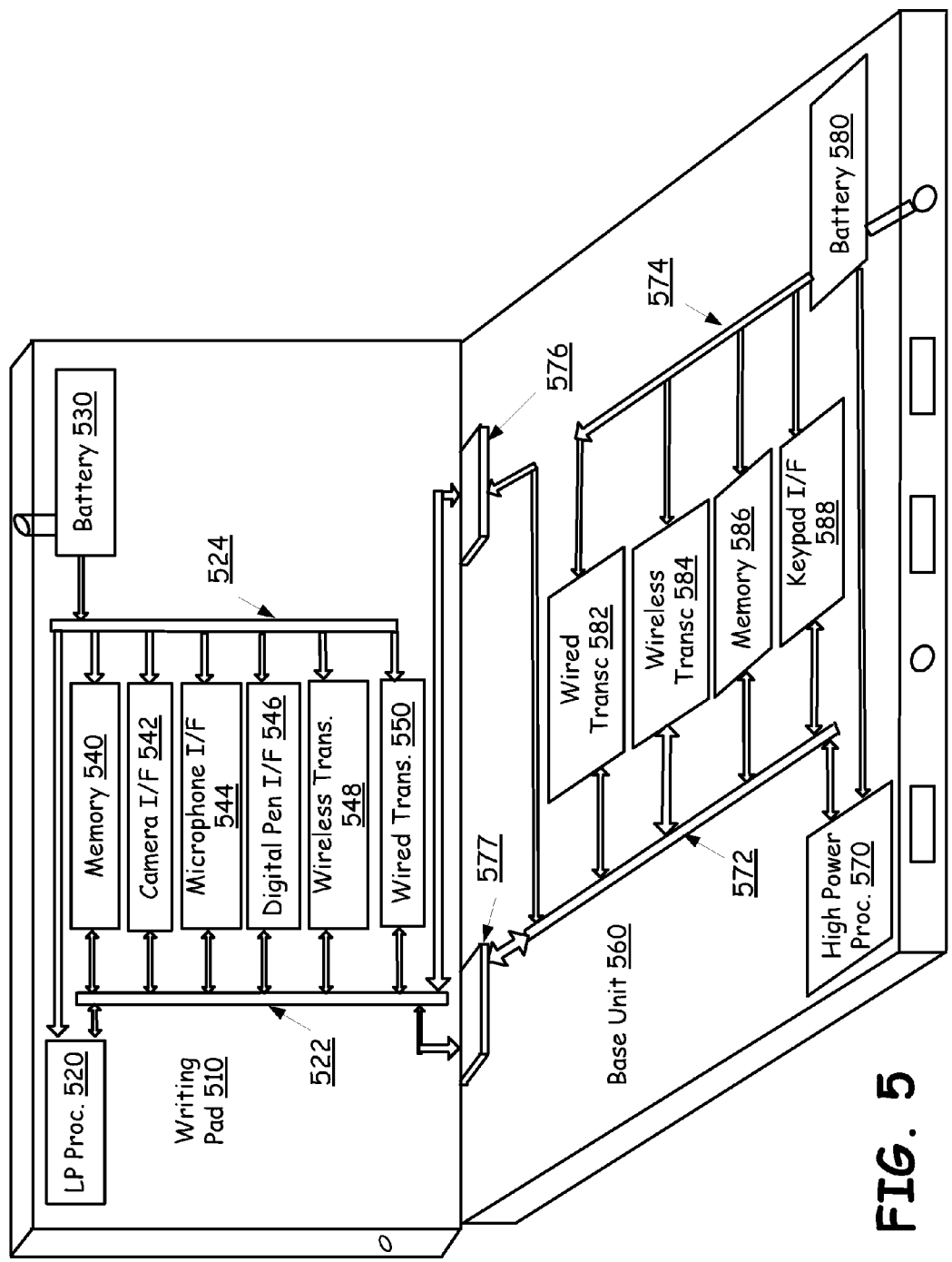
FIG. 5 is a schematic block diagram that shows interaction of the plurality of functional units of the writing pad of FIG. 4 with the plurality of functional units of the base unit of FIG. 4 when the writing pad is docked into the base unit.

FIG. 5 is a schematic block diagram that shows interaction of the plurality of functional units of the writing pad 410 of FIG. 4 with the plurality of functional units of the base unit 460 of FIG. 4 when the writing pad 410 is docked into the base unit 460. The writing pad 510 includes a data bus 522, a power bus 524, a battery 530, a processor 520 with low processing power, a low capacity memory 540, a camera I/F 542, a microphone I/F 544, a digital pen I/F 546, a wireless transceiver 548, a wired transceiver 550 and a first pair of connectors (not shown). The low power processor 520, the low capacity memory 540, the camera OF 542, the microphone I/F 544, the digital pen I/F 546, the wireless transceiver 548 and the wired transceiver 550 receive power from the battery 530 via the power bus 524. The low capacity memory 540, the camera I/F 542, the microphone I/F 544, the digital pen OF 546, the wireless transceiver 548 and the wired transceiver 550 are communicatively connected to the low power processor 520 via the bidirectional data bus 522 and exchange information with the low power processor 520 via the data bus 522. The information includes data and/or control information. The data bus 522, in addition, is communicatively connected to the first pair of connectors. The base unit 560 includes a second pair of connectors 576 and 577. The first pair of connectors of the writing pad 510 gets physically and communicatively connected with the second pair of connectors 576 and 577 of the base unit 560 when the writing pad 510 is docked into the base unit 560. The data bus 522 of the writing pad 510 gets communicatively connected to the second pair of connectors 576 and 577 of the base unit 560 when the writing pad 510 is docked into the base unit 560. The low power processor 520, the low capacity memory 540, the camera I/F 542, the microphone I/F 544, the digital pen I/F 546, the wireless transceiver 548 and the wired transceiver 550 get communicatively connected to the second pair of connectors 576 and 577 of the base unit 560 when the writing pad 510 is docked into the base unit 560.

The base unit 560 includes a processor with high processing power 570, a battery 580, a wired transceiver 582, a wireless transceiver 584, a memory with high capacity 586, a keypad I/F 588, a data bus 572, a power bus 574 and the second pair of connectors 576 and 577. The high power processor 570, the wired transceiver 582, the wireless transceiver 584, the memory 586 and the keypad I/F 588 receive power from the battery 580 via the power bus 574. The wired transceiver 582, the wireless transceiver 584, the memory 586 and the keypad I/F 588 exchange data with the high power processor 570 through the data bus 572. The data bus 572 is communicatively connected to the second pair of connectors 576 and 577. The data bus 572 gets communicatively connected to first pair of connectors of the writing pad 510 when the writing pad 510 is docked into the base unit 560. A data pathway gets established between the high power processor 570 of the base unit 560 and the low power processor 520 of the writing pad 510 via the data bus 572 of the base unit 560, the second pair of connectors 576 and 577, the first pair of connectors (not shown here) and the data bus 522 of the writing pad 510 when the writing pad 510 is docked into the base unit 560.

The high power processor 570 controls operation of the wired transceiver 582, the wireless transceiver 584, the memory 586 and the keypad I/F 588 of the base unit 560. The high power processor 570 retrieves data from the memory 540 of the writing pad 510 via the data pathway between the writing pad 510 and the base unit 560 when the writing pad 510 is docked into the base unit 560. The retrieved data includes audio and/or digital ink recorded by the writing pad 510 when the writing pad 510 was not docked into the base unit 560. The high power processor 570 runs voice recognition application on the recorded audio and optical character recognition application on recorded digital ink. The high power processor 570 in addition does one of the following when the writing pad 510 is in docked mode: (a) controls operation of the plurality of the functional units of the writing pad 510 (520, 540, 542, 544, 546, 548, 550), thereby overriding the low power processor 520, (b) directs the low power processor 520 to control operation of the plurality of functional units of the writing pad 510, (c) sends data to the low power processor 520 via the data pathway and directs the low power processor 520 to display the data on the writing pad 510. A display is laid on top surface of the writing pad 510 and the low power processor 520 displays the data sent by the high power processor on the top surface of the writing pad 510. The high power processor 570 of the base unit 560 sends control information and/or data to the plurality of the functional units of the writing pad 510 (520, 540, 542, 544, 546, 548, 550) via the data pathway that gets established between the writing pad 510 and the base unit 560 when the writing pad 510 is docked into the base unit 560 in situation (a), (b) and (c).

Figure 6:
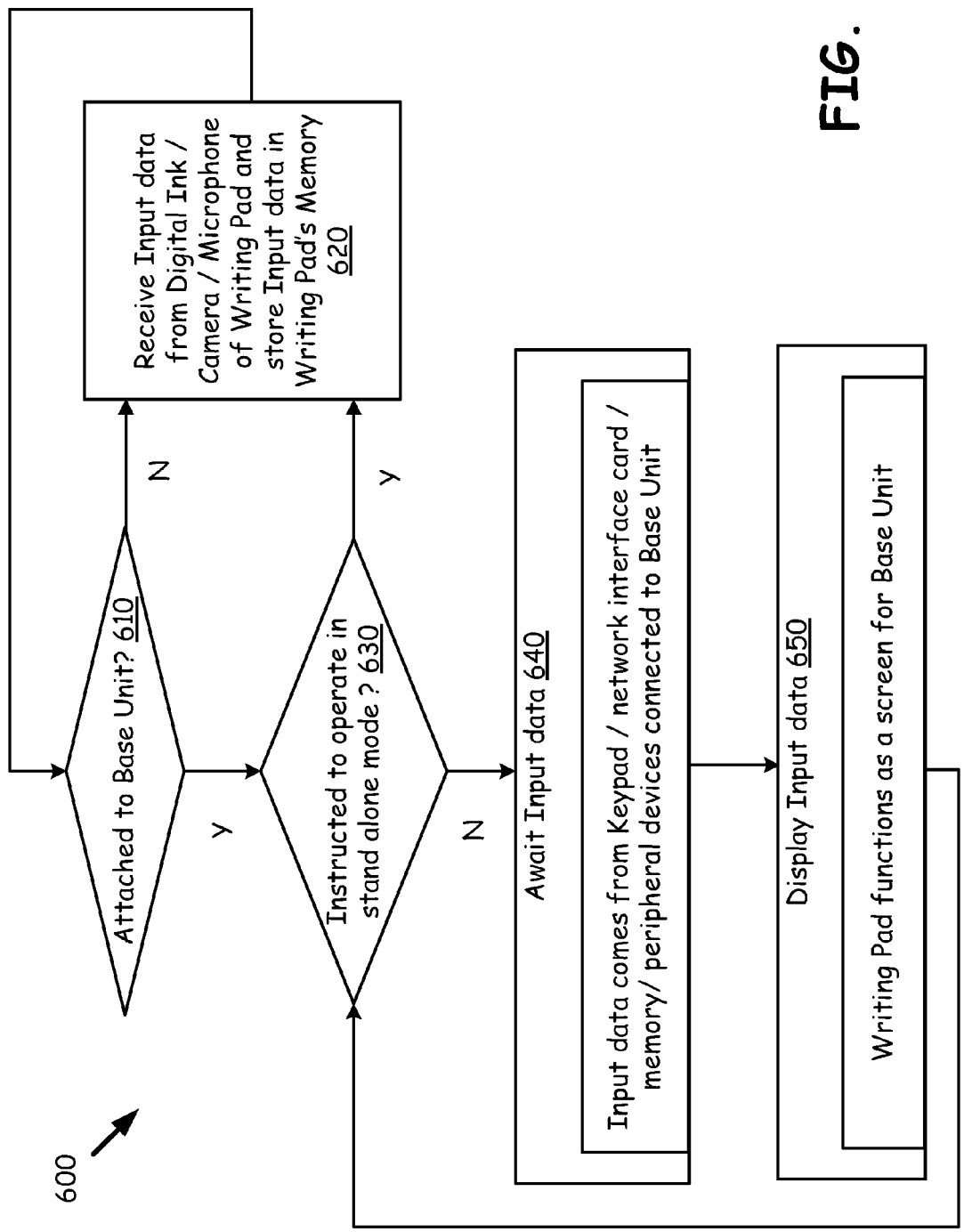
FIG. 6 is a flow chart illustrating a method of operation of a writing pad that functions as per instructions from a base unit when docked into the base unit.

FIG. 6 is a flow chart illustrating a method 600 of operation of a writing pad that functions as per instructions from a base unit when docked into the base unit. The writing pad includes at least one microphone, at least one camera, a display, a memory and supports digital ink. The writing pad determines whether the writing pad is docked into the base unit in block 610. The writing pad is adapted to work as per instruction from the base unit if the writing pad is docked into the base unit in block 610. The writing pad further determines in block 630 a mode in which the writing pad is to operate if the writing pad is docked into the base unit. The writing pad receives the digital ink and data from one or more of the at least one microphone, the at least one camera in step 620 if the writing pad determines in the block 610 that the writing pad is not docked into the base unit or the writing pad determines in the block 630 that the writing pad is instructed to operate in stand alone mode. The writing pad stores the digital ink and the data received in the step 620 in the memory of the writing pad. The writing pad waits for input data from the base unit as shown in block 640 if the writing pad determines that it has been instructed to not operate in stand alone mode. The input data in the block 640 comes from one or more of a keypad of the base unit, network interface card of the base unit, memory of the base unit and any of a variety of peripheral devices communicatively connected to the base unit. A communication pathway between the writing pad and the base unit comes into existence when the writing pad is docked into the base unit. The input data flows from the base unit to the writing pad via the communication pathway in the block 640. The writing pad displays the input data received from the base unit on the display of the writing pad as shown in block 650.

Figure 7:
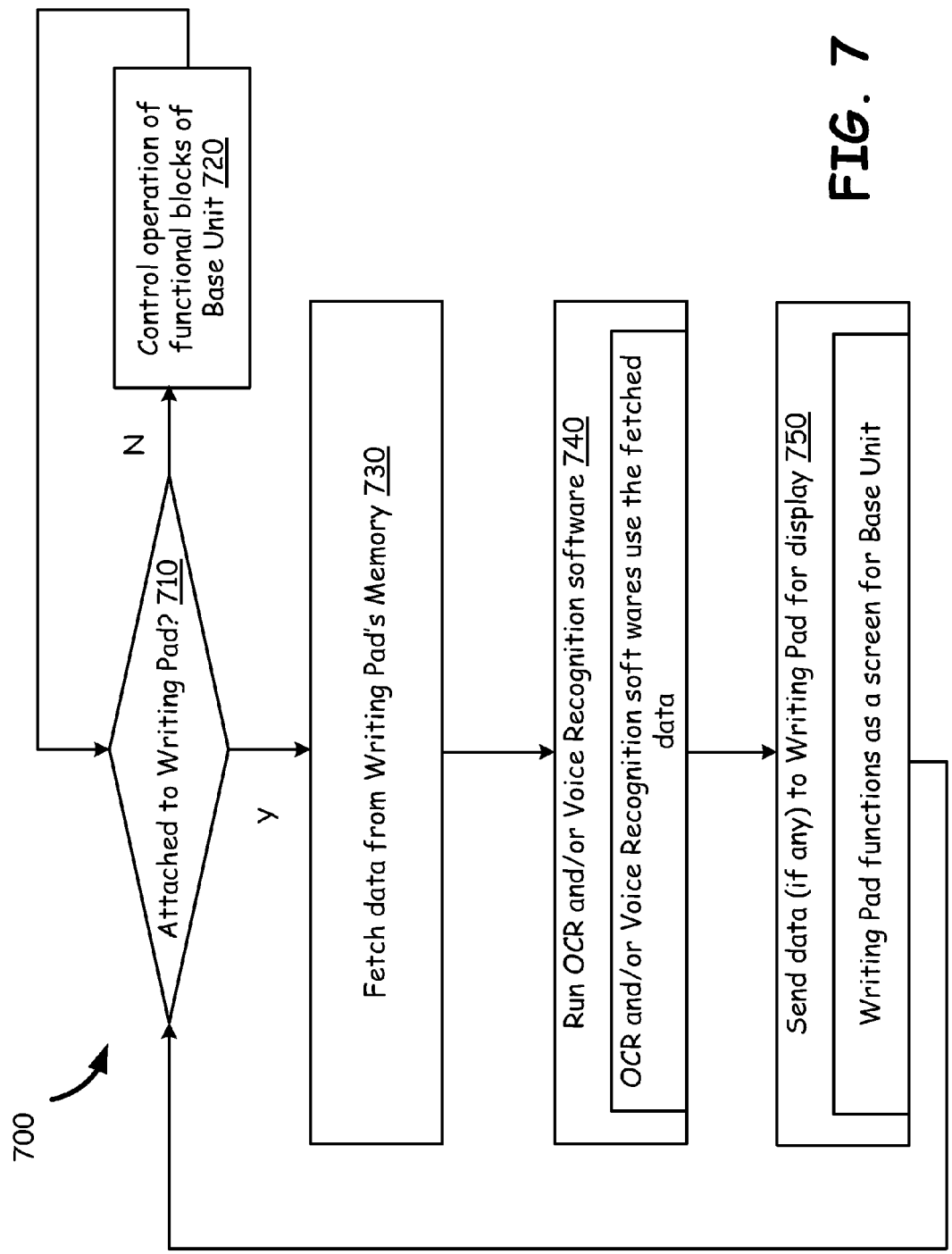
FIG. 7 is a flow chart illustrating a method of operation of a base unit that controls operation of a writing pad when the writing pad is docked into the base unit.

FIG. 7 is a flow chart illustrating a method of operation 700 of a base unit that controls operation of a writing pad when the writing pad is docked into the base unit. The base unit includes a processor and voice recognition software and optical character recognition software. The writing pad is adapted to capture digital ink, audio and video and to store the captured audio, video and digital ink in a memory of the writing pad. The base unit in block 710 determines if the writing pad is attached to the base unit. The base unit controls operations of a plurality of functional units of the base unit if the writing pad is not docked into the base unit. The plurality of functional units of the base unit are, typically and not restricted to, a memory, a network interface, an input interface etc. Each of the plurality of functional units is one or combination of a hardware and a software. The base unit fetches the captured data from the memory of the writing pad as shown in a block 730 if the writing pad is attached to the base unit. In a next step 740 the base unit runs the optical character recognition (OCR) software on the captured digital ink and runs the vice recognition software on the captured audio. Information that gets generated after running the OCR software and the voice recognition software on the captured digital ink and the captured audio respectively is sent by the base unit to the memory of the writing pad for storage or stored by the base unit in the memory of the base unit. The base unit in addition to running the OCR software and voice recognition software sends data to a display of the writing pad. The data includes one or more of an input received via the network interface or the input interface of the base unit, information stored in the memory of the base unit etc.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A mobile device that is configured to interact with a support system, the support system being configured to perform conversions of voice data and input data to corresponding text data, the mobile device comprising:
    a microphone configured to capture voice data during a capture session;
    a user input element configured to capture input data during the capture session; and
    a processor configured to support a first operational mode and a second operational mode, the first operational mode including internal handling of both the voice data and input data, and the second operational mode involving delivering both the voice data and the input data to the support system and receiving from the support system the corresponding text data, wherein the delivering and the receiving both occurring during the capture session.

2. The mobile device of claim 1, wherein the input data comprises digital ink data.

3. The mobile device of claim 2, wherein the corresponding text data includes Optical Character Recognition (OCR) data produced by the support system from the digital ink data.

4. The mobile device of claim 1, wherein the corresponding text data is based upon voice recognition of the voice data by the support system.

5. The mobile device of claim 1, wherein the input data comprises keyboard input.

6. The mobile device of claim 1, further comprising a first data bus configured to dock with a second data bus of the support system.

7. The mobile device of claim 6, wherein the processor is further configured to:
    receive a direction to continue capturing the voice data and the input data when the mobile device is docked to the support system; and
    upon receipt of the direction, continue capturing the voice data and the input data when the mobile device is docked to the support system.

8. A mobile device that is configured to interact with a support system, the support system being configured to perform conversions of voice data and input data to corresponding text data, the mobile device comprising:
    a plurality of capture elements that are configured to capture input data and voice data, the plurality of capture elements comprising both a user input element and a microphone; and
    a processor configured to support a first operational mode and a second operational mode, the first operational mode involving internal handling of the input data, and the second operational mode involving delivery of at least a portion of the input data to the support system and receiving from the support system the corresponding text data, and wherein the delivering and the receiving both occurring during the capture of the input data.

9. The mobile device of claim 8, wherein the input data comprises digital ink data.

10. The mobile device of claim 9, wherein the corresponding text data includes Optical Character Recognition (OCR) data produced by the support system from the digital ink data.

11. The mobile device of claim 8, wherein the corresponding text data is based upon voice recognition by the support system of voice data captured by the microphone.

12. The mobile device of claim 8, wherein the input data comprises keyboard input.

13. The mobile device of claim 8, further comprising a first data bus configured to dock with a second data bus of the support system.

14. The mobile device of claim 13, wherein the processor is further configured to:
receive a direction to continue capturing the voice data and the input data when the mobile device is docked to the support system; and
upon receipt of the direction, continue capturing the voice data and the input data when the mobile device is docked to the support system.

15. A mobile device that is configured to interact with a support system, the support system being configured to perform conversions of input data to corresponding text data, the mobile device comprising:
a microphone configured to capture a first portion of input data during a capture session;
a user input element configured to capture a second portion of input data during the capture session; and
a processor configured to support a first operational mode and a second operational mode, the first operational mode involving internal handling of both the input data, and the second operational mode involving delivering at least a portion of the input data to the support system during the capture session and receiving from the support system the corresponding text data, wherein the delivering and the receiving both occurring during the capture session.

16. The mobile device of claim 15, wherein the second portion of the input data comprises digital ink data.

17. The mobile device of claim 16, wherein the corresponding text data includes Optical Character Recognition (OCR) data produced by the support system from the digital ink data.

18. The mobile device of claim 15, wherein the corresponding text data is based upon voice recognition by the support system of voice data captured by the microphone.

19. The mobile device of claim 15, wherein the second portion of the input data comprises keyboard input.

20. The mobile device of claim 15, further comprising a first data bus configured to dock with a second data bus of the support system.

21. The mobile device of claim 20, wherein the processor is further configured to:
receive a direction to continue capturing the voice data and the input data when the mobile device is docked to the support system; and
upon receipt of the direction, continue capturing the voice data and the input data when the mobile device is docked to the support system.

* * * * *